United States Patent [19]
Fukunaga

[11] 3,980,861
[45] Sept. 14, 1976

[54] ELECTRICALLY HEATED MINIATURE THERMAL IMPLEMENT

[76] Inventor: Akio Fukunaga, 2055 Colby Ave., Los Angeles, Calif. 90025

[22] Filed: Feb. 4, 1974

[21] Appl. No.: 439,562

Related U.S. Application Data

[63] Continuation-in-part of Ser. No. 344,945, March 26, 1973, abandoned.

[52] U.S. Cl. ............................. 219/230; 30/140; 81/9.5 B; 81/43; 83/171; 128/303.1; 219/236; 228/51
[51] Int. Cl.² ...................... H05B 1/00; H02G 1/12
[58] Field of Search ............ 219/221, 223, 227–233, 219/235–240; 81/9.5 R, 9.5 B, 9.5 C, 9.51, 43; 83/170, 171; 30/140; 128/303.1, 303.14–303.19; 228/51–55

[56] References Cited
UNITED STATES PATENTS

| | | | |
|---|---|---|---|
| 1,065,679 | 6/1913 | Gregson et al. | 81/9.5 R |
| 1,386,436 | 8/1921 | Smith | 81/43 |
| 1,422,826 | 7/1922 | Brown | 219/230 UX |
| 1,526,063 | 2/1925 | Griffin et al. | 81/9.5 R |
| 1,889,475 | 11/1932 | Henkel | 81/43 |
| 2,012,937 | 9/1935 | Bevoy | 219/230 |
| 2,230,665 | 2/1941 | Green | 219/230 |
| 2,894,424 | 7/1959 | Vaughan | 81/43 X |
| 3,752,017 | 8/1973 | Lloyd et al. | 219/230 UX |
| 3,804,320 | 4/1974 | Vandermark | 219/230 X |

FOREIGN PATENTS OR APPLICATIONS

| | | | |
|---|---|---|---|
| 920,918 | 12/1954 | Germany | 219/230 |
| 680,650 | 10/1952 | United Kingdom | 219/230 |
| 820,656 | 9/1959 | United Kingdom | 81/9.5 R |
| 945,402 | 12/1963 | United Kingdom | 81/9.5 B |

*Primary Examiner*—A. Bartis
*Attorney, Agent, or Firm*—Henry M. Bissell

[57] ABSTRACT

A miniature thermal wire stripper having a pair of heater elements in the form of hollow tubes each with a heater coil disposed therein and affixed to a pair of spring loaded handles for contacting and subsequently melting through thermal (e.g. thermoplastic) insulation about a wire from which insulation is to be stripped. A pair of wire stripping clamping members in the form of blades respectively attached to the hollow tubes have semi-circular recesses in the clamping edge thereof. In one embodiment, the circuit for the heater elements is completed through the blades so that the blades are heated only when held together in contact with each other or with the wire being stripped. In another embodiment the implement resembles a pair of tweezers having particularly shaped blades at the operative end which are configured to serve the purpose of the particular function for which the implement is designed. The heater elements are in the form of resistive wires embedded in the respective blades and disposed so as to most effectively develop the desired high temperature at the blade edges. When intended for use as a thermal wire stripper, the blade edges are provided with mating recesses of different sizes near the points of the blades to accommodate various diameters of the wires to be stripped. When designed for use as a surgical implement, the edges of the blades may be configured with appropriate recesses to accommodate particular devices that are to be held and heated for use in a surgical operation or the like.

18 Claims, 16 Drawing Figures

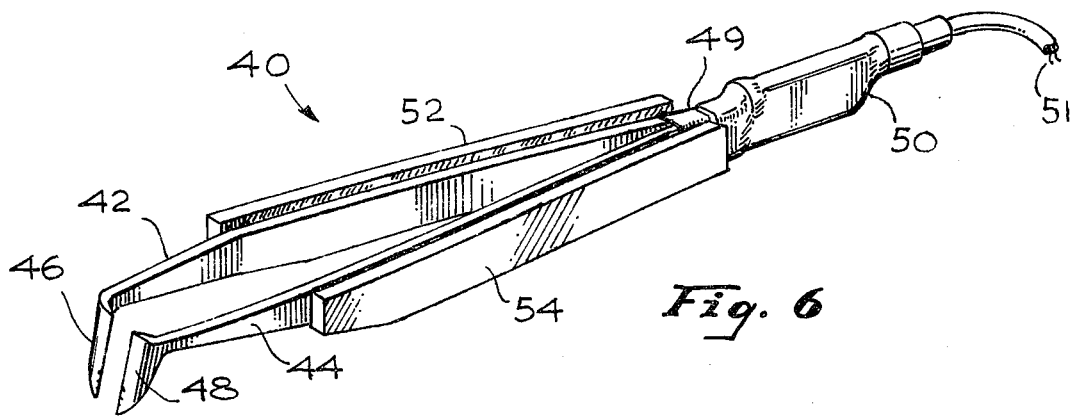
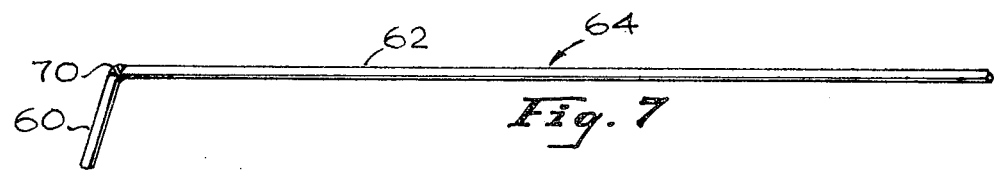
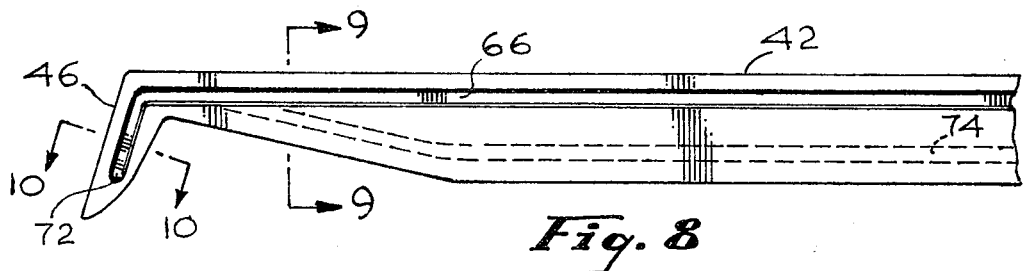
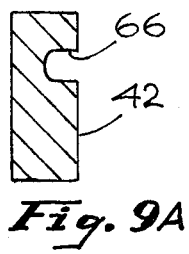
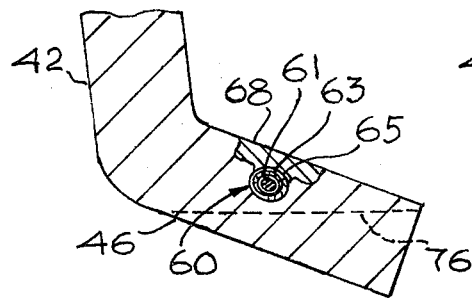
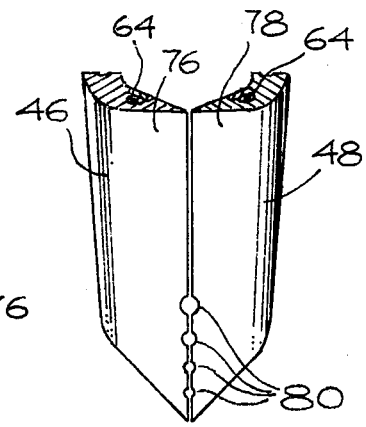
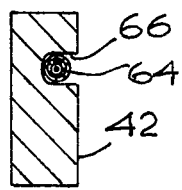
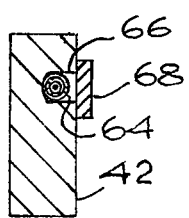
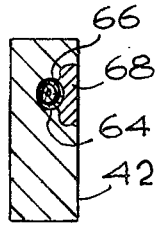
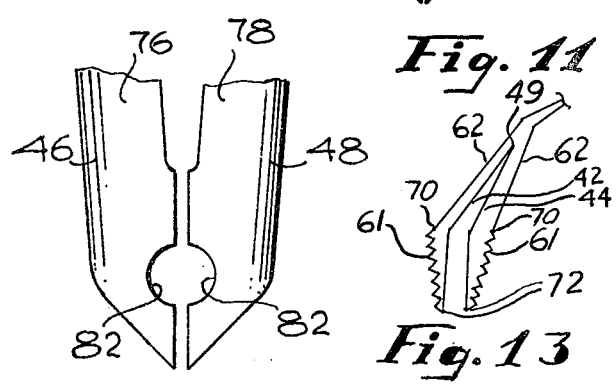

ELECTRICALLY HEATED MINIATURE THERMAL IMPLEMENT

CROSS-REFERENCE TO RELATED APPLICATION

This is a continuation in part of my copending application Ser. No. 344,945, filed Mar. 26, 1973, entitled A MINIATURE THERMAL WIRE STRIPPER, now abandoned.

BACKGROUND OF THE INVENTION

1. Field of the Invention

This invention relates to devices for stripping insulation from sections of an insulated electrical wire and more particularly to a hand-operated electrically heated miniature thermal wire stripper. The invention also relates to similar devices which may be used as a thermal implement for surgical operations, as well as to methods of fabrication of such devices.

2. Description of the Prior Art

The removal of insulation from electrical conducting wires in order to prepare the wires for further connection to associated circuitry has long been a difficult task in miniature circuitry where the wires are very small. The strong trend in the electronic business toward lighter and more compact electronic assemblies which have led to lighter and thinner electrical wires is well known. The smallest nick or even a shallow scratch, especially at the end of the insulation sleeve remaining on the conductor, increases the susceptibility of the wire to breakage. Also it is to be realized that, in very small conductors, the conductor is closely dimensioned to a given current capacity and the removal of the strand from a standard multi-strand conductor drastically changes the electrical characteristics of the conductor and destroys its effectiveness.

Devices for removing insulation from wires are generally known as wire strippers and may be broadly divided into two types. The first is a strictly mechanical device which grips the wire in two places, cuts the insulation between the two with a pair of opposed semicircular cutting edges selected for the gauge of the wire, and pulls the cut insulation off the wire by laterally separating the two grip points. This mode of operating requires that a relatively long length of the insulated wire be available and that the wire be comparatively large, which usually precludes its use with either short lengths of wire or in miniature applications or in places were access is limited.

Even though the cutting blades are provided with a plurality of mated semicircular notches which are accurately sized for the different gauges of the wire, the most skilled assemblers must exercise great care to avoid damaging wires during the wire stripping operation. Even slightly touching or damaging one or two strands of a multi-strand miniature conductor destroys the operability of the conductor, since all conductors are generally designed with the current capacity closely corresponding to the size of the conductor. The stripper therefore is not entirely satisfactory as a tool in the assembling of circuits which are very small and wherein it is desired to strip insulated wires which are attached to electronic circuitry.

Another type of wire stripper known in the art avoids the danger of nicking or cutting wires and uses heat instead of a cutting blade to sever thermal insulation. Usually a signal heated filament is used to melt through the insulation. Such strippers are mostly used in preparing lengths of wires for production line assembly where the wires are precut to predetermined lengths and stripped to approximately ½ inch from each end. Special stripping operations are frequently done with small pliers, a knife or even with the fingernails of the assembler or repairman where cutting and stripping of insulation must be done in place in a miniature electrical circuit, as on a printed circuit board or the like. The wire must be handled with great caution to avoid damage to heat-sensitive components and it is clumsy and often impossible to use a conventional wire stripper where space is limited or in applications in miniature circuitry where it is desired to strip wire in place or with short lengths of wire to be stripped.

Thus the prime need today which is provided by the present invention is a thermal wire stripper that both severs the insulation and strips the insulation from a wire located in a limited access space in a single smooth hand operation without the danger of nicking, scratching, or burning or otherwise damaging the bare wire and with limited risk of damage to associated circuit components because of its small size and offset configuration.

SUMMARY OF THE INVENTION

In brief, in accordance with the present invention, a miniature thermal implement is provided which includes a pair of laterally offset, separable jaws which are preferably in the form of opposed blades with aligned semicircular notches of selected size arrayed along a portion of their abutting edges. The jaws are laterally offset from a handle member including a spring biasing the jaws apart. Tiny heater elements, one for each jaw, are embedded therein an connected to electrical conductors extending back along the handle member for connection to a power source which may be either a-c or d-c and typically is a lower-voltage (12–16 volts) transformer. A switch may be included for energizing the heater circuit.

In one arrangement in accordance with the invention, the jaws and associated heaters may be in the form of triangular blade members having pointed tips and attached to first and second hollow tubes, each having a miniature heating element therein and each affixed to an support element with the support elements mutually movable with respect to each other in response to pressure from the hand of the operator. The hollow tubes are fixed to each of the support elements for contacting and subsequently melting opposite sides of the wire from which insulation is to be stripped in response to initial motion of the support elements relative to each other.

The device is particularly advantageous in that it utilizes hollow tubes having heating coils disposed therein allowing the size of the heater elements contacting the wire to be extremely tiny, thereby making the tool accessible to the smallest spaces. The major advantage therein of providing heater elements separate from the contact means in contradistinction to resistance heating devices is that extreme microminiaturization of components may be realized and fabrication of the device is facilitated.

The pair of wire clamping members which are attached to the hollow tubes have semicircular recesses in their clamping edges which may be selectively sized to fit different sized wires. A thermal wire stripper is thereby provided which is simple, efficient and readily accessible to small spaces.

In one arrangement of the invention, the heater elements are respectively connected to their tube enclosure so that the handle member completes the electrical circuit for the heaters. In another arrangement, the heaters are similarly connected, but the handle members insulated.

In another particular arrangement in accordance with the invention, the implement is in the form of a pair of tweezers with curved blades forming laterally offset, separable jaws. The heater elements comprise suitable insulated resistance wires embedded in the jaws adjacent the edges thereof and being electrically connected, as by welding, to the respective blades at their outer ends. The blade edges may be suitably notched to accommodate varying sizes of wires when the implement is to be used as a wire stripper. The blade edges may be configured in other shapes as may be suitable for gripping and heating other elements or tools, as for example when the implement is designed for use as a surgical implement.

In a particular method of fabrication of the device in accordance with the present invention, a Nichrome wire of approximately 0.007 inches in diameter and a length slightly less than the length of the blade edge is welded at an angle of approximately 75° to a nickel lead wire of approximately 0.01 inches in diameter. This assembly is then plated electrolytically with aluminum oxide to develop a coating of approximately 0.004 inches in thickness. The assembly is then dipped in a water-graphite solution to provide a thin conductive coating on the outside of the aluminum oxide to permit a final plating step. This coating is less than approximately 0.005 inches in thickness. Thereafter, the assembly is placed in an electro planting bath until a layer of nickel is deposited to a thickness of approximately 0.003 inches. This outer nickel sheath serves the purpose of protecting the aluminum oxide layer from damage or rupture during further fabrication steps such as working, pressing, etc. A pair of such heater and lead wires are prepared in this manner for a single implement.

A pair of steel base strips are prepared to receive the above-described assemblies by coining a groove approximately 0.026 inches in diameter of the desired shape in each of the strips. Preferably, these grooves are formed by pressing a particularly shaped wire of extremely hard material as a die against the strip. It is preferred that the respective grooves be offset from each other when these two strips are joined to form the implement in order to avoid any possible short circuit. Thereafter, a combination assembly of heater element and lead wire is embedded into each groove and a cover strip corresponding to the shape of the groove and approximately 0.15 inches thick and 0.040 inches wide is placed in position to cover the groove with the wire assembly inside, after which the cover strip is pressed into the base strip until its outer surface is flush with the face of the base strip, thus forming a side member and sealing the wire assembly in place within the groove thereof and protecting it during the later forming and shaping steps and during ultimate use of the implement.

The side member is then cut to the desired shape and the blade end is bent through approximately a right angle, ground, sharpened and suitably notched to serve its intended function. Two such mating side members are secured together at their ends remote from the blades, electrical leads are attached to the previously assembled lead wires and handles are affixed to finished the fibrication of the implement.

As an alternative possibility, only the blade end portion of the side member is fabricated in the manner described above, after which the portion is joined, as by welding, to another strip of a different material which is not required to endure the continuous high heat encountered at the blade portion during use. Preferably, at least the blade end of the implement comprises a high temperature stainless steel capable of withstanding high temperatures without oxidizing. One material particularly suitable for this implement is a nickel alloy sold under the trademark Hasteloy which has the capability of being maintained continuously at temperatures to 1500° F. without oxidizing.

DESCRIPTION OF THE DRAWINGS

A better understanding of the invention may be gained from a consideration of the following detailed description, taken in conjunction with the accompanying drawing, in which:

FIG. 6 is a perspective view of an alternative miniature thermal implement in accordance with the present invention;

FIG. 7 is a view of an assembly incorporated as part of the embodiment of FIG. 6;

FIG. 8 is a side elevation view showing a portion of the embodiment of FIG. 6 during fabrication;

FIGS. 9A, 9B, 9C and 9D are sectional views taken along the line 9—9 of FIG. 8 and depicting different steps in the fabrication process;

FIG. 10 is a sectional view of a portion of the member of FIG. 8, taken along the line 10—10 thereof;

FIG. 11 is a front view of the blade portions of the embodiment of FIG. 6 illustrating a particular shape of the blade edges for use as a thermal wire stripper;

FIG. 12 is a view similar to FIG. 11 showing an alternative configuration of the blade edges for use as a surgical implement or the like; and FIG. 13 is a schematic diagram of the electrical circuit of the embodiment of FIG. 6.

DESCRIPTION OF THE PREFERRED EMBODIMENTS

Figure 1:
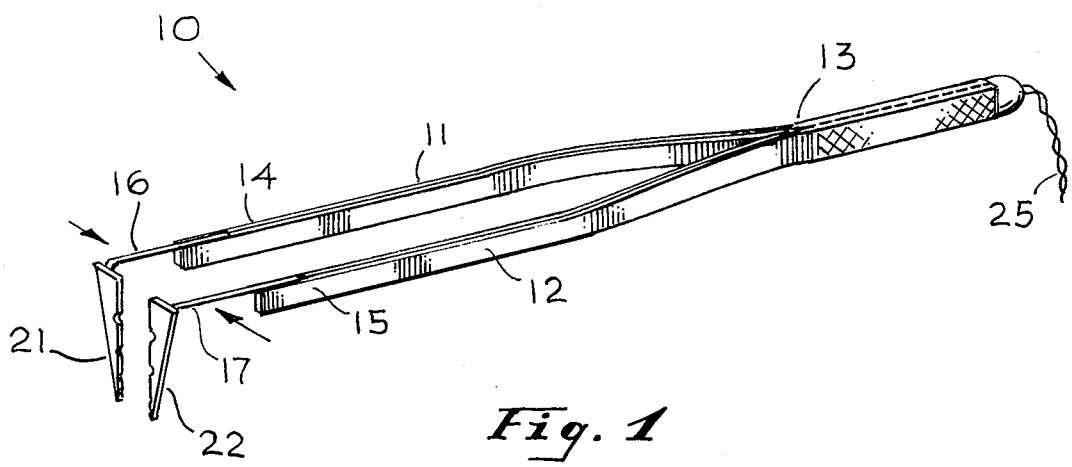
FIG. 1 is a perspective view of a miniature thermal wire stripper according to the present invention.

Turning now to the drawing, and in particular to FIG. 1, there is shown in perspective a thermal wire stripper 10 according to the preferred embodiment of the present invention. In appearance the wire stripper 10 resembles a pair of tweezers which are spring loaded, biased to the open position, and have a pair of handle members 11 and 12 pivotally joined at pivot point 13 to form opposing contact or jaw members. Other embodiments may utilize contact members which are biased away from contact by a resilient spring element. In the preferred embodiment of FIG. 1, the handles 11 and 12 provide the spring bias to maintain the tool in open position prior to manual pressure contact by the operator.

Figure 3:
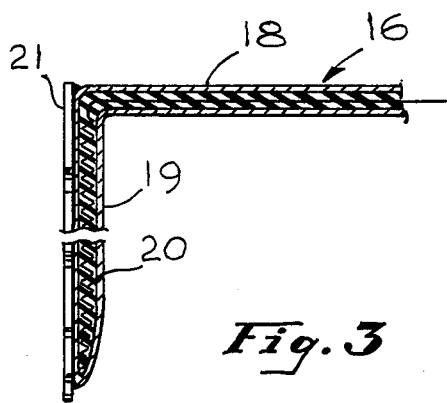
FIG. 3 is a further enlarged schematic view of the portion of FIG. 2 illustrating in section the heater elements.
Figure 2:
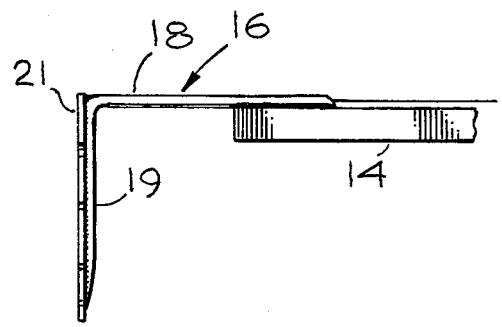
FIG. 2 is an enlarged side view of the contacting portion of the wire stripper of FIG. 1.

Fixedly supported in each of the forward support elements 14 and 15 of the handles 11 and 12 are miniature hollow tubes 16 and 17 which in the preferred embodiment are L-shaped, having a horizontal portion 18 extending from the support element 14 and a vertical portion 19 ending at right angles to the horizontal portion 18 (FIG. 2). The tubes 16 and 17 are identically constructed and diametrically opposed and serve to support attached clamping members 20, 21 disposed to encircle and contact the wire to be stripped. Supported within the vertical portion 19 of the hollow tube 16 as seen in FIG. 3 is a small heater element 20. The heater element 20 may be of conventional fabricated Nichrome wire of approximately 0.002 inch in diameter and may be wound as a coil in helical fashion or be straight. In the embodiment shown in FIG. 3, the heater 20 terminates in a connection to the tube 16. Alternatively, it may be insulated therefrom with connecting wires from the coil being brought out through the tube 16. The remainder of the space in the vertical portion 19 of the tube may be filled with aluminum-oxide insulation, electro-plated as described hereinabove and with the wire being wound and stretched slightly to separate adjacent coils. Alternatively to provide more power and higher heat a straight wire with a larger diameter may be utilized. The electrical circuitry of the heater coil 20 is such that the coil is connected to a source of electrical power (not shown), through conventional leads 25 with a control switch (not shown) for selectively energizing the heater circuit.

Figure 4:
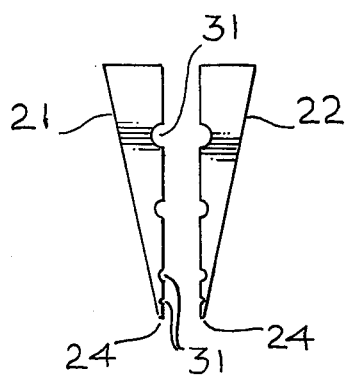
FIG. 4 is an end view of the device of FIG. 1 showing the clamping elements in open position.
Figure 5:
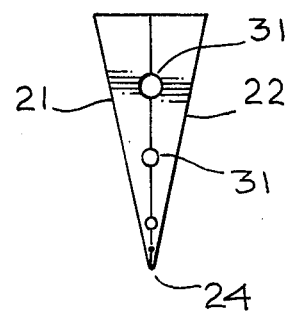
FIG. 5 is an end view of the clamping elements showing the elements in their contact or closed position.

Clamping members 21 and 22 are welded or brazed to the vertical portion of the tube as shown in FIG. 3. Each comprises a plate having a plurality of semi-circular recesses in its clamping edge thereof as shown in FIG. 4 to form a plurality of circular recesses 31 which are differently sized in accordance with the wire to be stripped. The clamping members are triangularly shaped terminating in a point 24 at the bottom end thereof to provide a narrow, fine tip and are positioned so as to abut together along the clamping edge thereof.

In operation, the tool of FIG. 1 is placed in contact with a wire to be stripped in its open position. The access space may be severely limited but only enough space is needed to slide the pointed tip 24 at the end of the vertical portion 19 past the wire to be stripped. Since the diameter of the tube is about 0.020 inch an extremely minute access space is reachable by the tool. When the wire is spaced within one of the circular recesses, the tool is hand operated to close contact with the wire. The clamping members are heated by the adjoining heater elements and the particular recess 31 in contact with the wire melts through the insulation. Once the insulation is severed, longitudinal sliding movement of the tool along the wire causes the clamping edges to strip the insulation away. The clamping edges are designed to have operatively dull edges to reduce any chance of cutting the wire proper. Where contact of the triangular clamping members 21, 22 is required to complete the heater circuit, the tool 10 may be closed momentarily before being placed around the wire for preheating or, if squeezed around the wire, the torsion of the supports 16, 17 permits the members 21, 22 to contact and the tips are thus heated to melt the insulation.

In the alternative embodiment 40, particularly as shown in FIG. 6, a pair of side members 42 and 44 having blade-shaped portions 46 and 48 at one end and being joined together at the opposite end 49 in the manner of a pair of tweezers are formed with sufficient springiness to maintain the structure essentially in the configuration shown. Respective handle strips 52 and 54 are affixed to the outsides of the side members 42, 44. The handle strips 52, 54 are preferably of a thermal insulating material to protect the user's fingers from being burned. The blade portions 46, 48 are shaped, notched and sharpened to a fine edge as shown for use as a thermal wire stripper or other instrument where such a configuration having the capability of developing and maintaining extremely high temperature is desired.

FIG. 7 illustrates a portion of the embodiment of FIG. 6 in the form of an assembly 64 comprising a resistance wire (such as Nichrome) heater element 60 and an attached lead wire 62, preferably of nickel, fabricated in the embodiment 40 of FIG. 6 so as to be concealed from view and inaccessible to abrasion or other damage.

FIG. 8 represents a side member 42 at a particular point in the fabrication process in which a coined groove 66 is pressed into the metal of the member 42. This groove 66 is illustrated in the sections 9A-9D as, respectively: in the configuration as initially formed; containing the assembly 64; having a cover strip 68 placed in position thereover; and with the cover strip 68 pressed down into the member 42 to fill the groove 66 and re-establish the flush surface of the member 42. With the strip 68 thus protecting the assembly 64 as contained within the groove 66, the side member 42 may be carried through other fabrication steps, such as bending, working, and the like, without any damage being done to the constituents of the assembly 64.

It will be understood that the assembly 64 comprising the Nichrome wire heater element 60 and nickel lead wire 62 may be welded together at the point 70 of FIG. 7 at an angle of approximately 75° as indicated. Referring again to FIG. 8, when the assembly 64 is placed in the groove 66, the outermost end of the Nichrome wire heater element 60 is welded to the blade portion 46 of the side member 42 at a point indicated at 72. Also in FIG. 8, the broken lines indicate the position of another groove 74 which may be located in the other side member 44 laterally displaced from the position of the groove 66 in the member 42 to avoid overlap of the two lead wires. During fabrication of the device in accordance with this embodiment of the invention, the assembly 64 may be prepared by plating, etc. in the process already described.

FIG. 10 illustrating a section of the blade portion 46 along the line 10–10 of FIG. 8 but following the steps illustrated in FIGS. 9A–9D shows the Nichrome heater element 60 embedded within the blade portion 46 with the latter being bent around through approximately a right angle to assume the desired configuration prior to the grinding, notching and sharpening steps in the fabrication process. The heater element 60 is prepared as already described hereinabove with a central Nichrome wire 61 plated with successive layers of aluminum oxide 63 and nickel 65.

As thus described, the side members 42, 44 are formed of a single continuous strip of suitable high temperature metal. If desired for reasons of economy or the like, only the portion of the side member such as 42 including the blade portion 46 and adjacent section need be fabricated of such high temperature material. The remainder of the member 42 from a line approximately coinciding with the broken line 9–9 of FIG. 8 may be fabricated of a less expensive material and joined, as by welding, to the blade portion 46 at a juncture line approximating the broken line 9-9.

FIG. 11 illustrates a pair of blade members 46, 48 having sharpened edged 76, 78 configured in position facing each other and with notches 80 therein of varying sizes to accommodate different diameters of wire to be stripped.

FIG. 12 depicts a configuration of blade edges 76 and 78 of the blades 46 and 48 which is provided with a pair of large notches 82 in mating relationship with each other which are particularly configured to grip the handle of a tiny surgical implement in order that such may be held and heated by the implement 40 of FIG. 6 during a surgical operation. The extremely high temperature which the implement of this invention is capable of maintaining concentrated in the very tip portion of the implement makes the implement desirable for such uses. Effective control of blade temperature can be maintained within given temperature ranges by varying the voltage and current applied to the implement via the leads 51 fed into the guard 50 and connected through the strips of the side members 42, 44 near the end 49 to join the lead wires 62 on the inside thereof.

By virtue of the unique construction of the described device, the heater elements 60 are completely embedded within the blades 46 and sealed therein by the impressed cover strip 68. This construction not only serves to locate the heater elements adjacent the point where the heat is to be applied, but it also serves to protect the heater element from contamination by the atmosphere and unwanted oxidation which might otherwise occur. This construction also protects the heater elements and related lead wires from damage during the further fabrication steps of the device and from physical damage during use, such as abrasion, shock and the like. All connections are welded to prevent the formation of high resistance contacts. The ends of the resistance wire 61 are welded respectively to the lower end of the blade 46 and to the lead wire 62. The electrical circuit between respective heater elements is completed through the corresponding side members which are welded together at the end 49. The result is an extremely effective implement for the purpose which further has the capability of undergoing successive sterilization cycles without adverse effect so that it can easily be used in connection with surgical operations if desired.

Such an electrical circuit is represented in FIG. 13 which shows the resistance wires 61 connected electrically at weld points 72 to associated conducting side members 42, 44 to establish a series circuit. The circuit is completed by the lead wires 62 connected respectively to the upper ends of associated resistance wires 61 at weld points 70. The members 42, 44 are connected together electrically, as by welding, at the point 49.

Although there have been described above particular arrangements of a miniature thermal implement and method of fabrication in accordance with the invention for the purpose of illustrating the manner in which the invention may be used to advantage, it will be appreciated that the invention is not limited thereto. While the preferred embodiment shows a tweezers structure for supporting the heater elements, other structures such as spring-biased pliers or flexible gripping arrangements can also be utilized. Accordingly, any and all modifications, variations or equivalent arrangements which fall within the scope of the annexed claims should be considered to be a part of the invention.

What is claimed is:

1. A miniature thermal implement comprising:
   a pair of heating elements each encased within a protective sheath;
   a pair of edged blade members supported in abutting alignment with each other for approximation along their respective edges;
   means affixing each sheath to a corresponding blade member in proximity to the edge thereof such that the heating element and sheath are generally aligned with the edge of the corresponding blade member;
   electrical circuit means electrically connected to opposite ends of the heating elements to establish an electrical circuit for connection to a source of electrical power; and
   spring biased support means attached to said blade members for maintaining them in alignment for operative engagement of their respective edges;
   the blade members being laterally displaced and extending toward each other from the associated support means with the edge of each blade member being located remote from its associated support means.

2. An implement in accordance with claim 1 wherein the protective sheath for each of the heating elements comprises a hollow tube extending from the support means and wherein each blade member comprises a triangular plate affixed to a corresponding hollow tube.

3. An implement in accordance with claim 2 wherein each heating element is mounted within its corresponding hollow tube within the portion thereof affixed to the associated triangular plate.

4. An implement in accordance with claim 3 wherein the triangular plates are mounted at an angle generally perpendicular to the support means and laterally offset therefrom.

5. An implement in accordance with claim 4 wherein the ends of the plates which are laterally offset from the support means are pointed and the abutting edges of the two triangular plates are notched with respective semicircular recesses to accommodate varying diameters of wires, the notches increasing in size with distance from the pointed ends of said plates, the notches of the two plates being aligned by pairs according to size.

6. An implement in accordance with claim 1 wherein the blade members and the support means comprise a pair of tweezers, each blade member having at least one notch along its abutting edge, said notches being positioned for respective alignment with each other, and wherein the circuit means include:
   means electrically connecting one end of each heating element to one end of its associated blade member.

7. An implement in accordance with claim 6 wherein each blade member is laterally offset from the support means and tapers in the direction of its edge to a sharpened point.

8. An implement in accordance with claim 7 wherein the edge of each blade member is provided with a plurality of notches of various sizes, the size increasing with distance from the pointed end of the blade member, the notches of the two blade members being aligned by pairs according to size.

9. An implement in accordance with claim 8 wherein each heating element and its protective sheath are embedded within a recessed groove adjacent the edge of an associated blade member.

10. An implement in accordance with claim 9 wherein said electrical circuit means includes a pair of electrical conductors, each encased within a protective insulating sheath and electrically connected to the other end of an associated heating element, said electrical conductor protective sheath being integrally extended from the protective sheath of the associated heating element, said electrical conductors being electrically insulated from said blade members and said support means by said protective insulating sheath.

11. An implement in accordance with claim 10 wherein the protective sheaths of said electrical conductor and said heating element comprise a layer of aluminum oxide surrounding said heating element and connected electrical conductor and a metal layer surrounding the aluminum oxide layer.

12. An implement in accordance with claim 10 wherein each electrical conductor and electrical conductor protective sheath combination is embedded within a second recessed groove extending along an associated one of said blade member support means.

13. An implement in accordance with claim 12 further comprising a cover strip pressed into said first-mentioned and said second recessed grooves on top of said heating element and said connected conductor to completely enclose the associated heating element and connected conductor within said recessed grooves.

14. An implement in accordance with claim 1 wherein said electrical circuit means includes said support means and blade members which are formed of an electrically conducting material and electrically connected together with the pair of heating elements to complete a series electrical circuit for connecting the heating elements to the power source, whereby the series electrical circuit comprises a first heating element, a first blade member electrically connected thereto, a first portion of said support means, a second portion of said support means, a second blade member, a second electrical heating element electrically connected thereto, and leads from the other ends of said heating elements disposed for connection to said power source.

15. A thermal implement having a tweezer-like configuration comprising:
 a pair of extended, generally parallel arms joined together at one end by means biasing the arms apart at the remote ends thereof,
 a pair of blade members, one for each arm, joined to said remote arm ends, the blade members being laterally offset and extending enwardly toward each other from the respective arms, each blade member terminating in a generally straight edge adjacent and generally parallel to the edge of the other blade, the blade members being positioned in abutting alignment of said edges;
 a pair of heating elements, each within an insulating sheath mounted adjacent to and generally aligned with the edge of an associated blade; and
 means for completing an electrical circuit to each of the heating elements for connection to a power source.

16. The implement of claim 15 wherein each blade member includes a notch positioned along the edge so as to define, with the other blade member notch, an aperture for receiving an item to be heated.

17. The implement of claim 16 wherein said notches are configured to receive a surgical tool to be grasped and heated by the implement.

18. The implement of claim 15 wherein each heating element and its insulating sheath are embedded within a recessed groove extending along the edge of the associated blade member, the end of the heating element remote from the associated arm being electrically connected to the associated blade member, each arm and blade member being of electrically conductive material for comprising said electrical circuit completing means, and further including a flush-mounted closure strip for encasing the heating element and insulating sheath within said recessed groove.

* * * * *